United States Patent
Kim et al.

(10) Patent No.: US 8,875,015 B2
(45) Date of Patent: Oct. 28, 2014

(54) THUMBNAIL DISPLAY METHOD AND IMAGE FORMING APPARATUS

(75) Inventors: Myoung-sim Kim, Yongin-si (KR);
Joo-duck Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 254 days.

(21) Appl. No.: 12/472,429

(22) Filed: May 27, 2009

(65) Prior Publication Data

US 2010/0088594 A1    Apr. 8, 2010

(30) Foreign Application Priority Data

Oct. 7, 2008    (KR) .................. 10-2008-0098406

(51) Int. Cl.
| | | |
|---|---|---|
| *G06F 3/00* | (2006.01) | |
| *G06F 3/12* | (2006.01) | |
| *G06F 17/22* | (2006.01) | |
| *G06F 17/21* | (2006.01) | |

(52) U.S. Cl.
CPC ............ *G06F 3/1246* (2013.01); *G06F 3/1285* (2013.01); *G06F 17/2247* (2013.01); *G06F 3/1256* (2013.01); *G06F 17/211* (2013.01); *G06F 3/1284* (2013.01); *G06F 3/1208* (2013.01)
USPC ....................................... 715/244

(58) Field of Classification Search
CPC . G06F 17/2247; G06F 17/211; G06F 17/212; G06F 3/1297; G06F 3/1256; H04N 1/00233; H04N 1/0044; H04N 1/00442
USPC ........................... 715/234, 243, 254, 255, 244
See application file for complete search history.

(56) References Cited

U.S. PATENT DOCUMENTS

| | | | |
|---|---|---|---|
| 7,916,332 B2 | 3/2011 | Kato | |
| 2003/0128239 A1* | 7/2003 | Angal et al. .................. 345/762 |
| 2005/0099518 A1* | 5/2005 | Mihara et al. ............ 348/333.05 |
| 2007/0147230 A1* | 6/2007 | Yasuda ......................... 370/214 |
| 2007/0168353 A1 | 7/2007 | Jang | |
| 2008/0024802 A1 | 1/2008 | Kato | |
| 2008/0151294 A1* | 6/2008 | Natori et al. ................. 358/1.15 |
| 2008/0178067 A1* | 7/2008 | Lahman et al. ............... 715/200 |
| 2008/0235603 A1* | 9/2008 | Holm et al. ................... 715/762 |
| 2008/0300850 A1* | 12/2008 | Chen et al. ...................... 703/22 |

(Continued)

FOREIGN PATENT DOCUMENTS

| | | |
|---|---|---|
| CN | 1794218 | 6/2006 |
| CN | 101118481 | 2/2008 |

(Continued)

OTHER PUBLICATIONS

XML Paper Specification: XPS Specification and User Guide, Microsoft, 2007.*

(Continued)

*Primary Examiner* — Kyle Stork
(74) *Attorney, Agent, or Firm* — Stanzione & Kim, LLP (57) ABSTRACT

A thumbnail display method is provided, which includes receiving a selection of an XML paper specification (XPS) file, receiving a preview command for the selected XPS file, analyzing a structure of the XPS file, and displaying thumbnail information regarding a plurality of thumbnails contained in the XPS file according to the analyzed structure. Therefore, it is possible for a user to preview various thumbnails contained in an XPS file.

18 Claims, 7 Drawing Sheets

(56) References Cited

U.S. PATENT DOCUMENTS

| | | | |
|---|---|---|---|
| 2008/0313537 A1* | 12/2008 | Tanaka | 715/274 |
| 2008/0320379 A1 | 12/2008 | Chen | |
| 2009/0046323 A1* | 2/2009 | Miyazaki | 358/1.16 |
| 2010/0050080 A1* | 2/2010 | Libert et al. | 715/716 |

FOREIGN PATENT DOCUMENTS

| | | |
|---|---|---|
| EP | 1892616 | 2/2008 |
| EP | 1975812 | 10/2008 |
| JP | 2008-186254 | 8/2008 |
| KR | 10-0742330 | 7/2007 |

OTHER PUBLICATIONS

"Microsoft(r) Computer Dictionary: Fifth Edition," published Mar. 15, 2002, Microsoft Press.*

Chinese Office Action dated Apr. 26, 2013 issued in CN Application No. 200910139941.2.

Korean Office Action dated Aug. 2, 2013 issued in KR Application No. 10-2008-0098406.

Chinese Office Action dated Aug. 7, 2014 issued in CN Application No. 200910139941.2.

* cited by examiner

```
<<a name=" "></a>?xml version="1.0" encoding="utf-8"?>
<Relationships xmlns="http://schemas.openxmlformats.org/package/2006/relationships">
  <Relationship
   Type="http://schemas.openxmlformats.org/package/2006/relationships/metadata/thumbnail"
   Target="/Resources/AllThumbs_5705.png"
   Id="Q0"/>
</Relationships>
```
310

FIG. 3B

```
<Relationships xmlns="http://schemas.openxmlformats.org/package/2006/relationships">
  <Relationship Type="http://schemas.microsoft.com/xps/2005/06/required-resource"
   Target="/Resources/courier.ttf" Id="Q1"/>
  <Relationship
   Type="http://schemas.openxmlformats.org/package/2006/relationships/metadata/thumbnail"
   Target="/Resources/PgIThumb_5705.png"
   Id="Q2"/>
</Relationships>
```
320

THUMBNAIL DISPLAY METHOD AND IMAGE FORMING APPARATUS

CROSS-REFERENCE TO RELATED APPLICATIONS

This application claims priority under 35 U.S.C. §119(a) from Korean Patent Application No. 10-2008-0098406, filed on Oct. 7, 2008, in the Korean Intellectual Property Office, the disclosure of which is incorporated herein by reference in its entirety.

BACKGROUND

1. Field of the Invention

The present general inventive concept relates to a thumbnail display method and an image forming apparatus. More particularly, the present general inventive concept relates to a thumbnail display method to provide a user with information regarding thumbnails stored in an XML paper specification (XPS) file, and an image forming apparatus to use the same.

2. Description of the Related Art

Image forming apparatuses generally print print data generated by terminal devices, such as computers, onto recording media. Examples of such image forming apparatuses include copiers, printers, facsimile machines or multifunction peripherals (MFPs) which combine functions of copiers, printers and facsimile machines in a single system.

Image forming apparatuses which have been widely used in recent years support a direct printing function to print document data, such as Portable Document Format (PDF) data, Tagged Image File Format (TIFF) data or Joint Photographic Experts Group (JPEG) format data. Such a direct printing function enables direct printing by merely transmitting a file to an image forming apparatus without the need to launch an additional application program in a terminal device, such as a personal computer (PC), a personal digital assistant (PDA) or a digital camera.

The direct printing function is applicable to an XML paper specification (XPS) file. An XPS file has a fixed-layout electronic file format that preserves document formatting and can be shared, and is a zip-formatted file which includes all kinds of data and resources described by systematizing all resources required for documents or jobs in a directory structure and by writing the references therebetween in XML. Such an XPS file has a logical structure in the form of a tree having a plurality of levels, as illustrated in FIG. 1.

Figure 1:
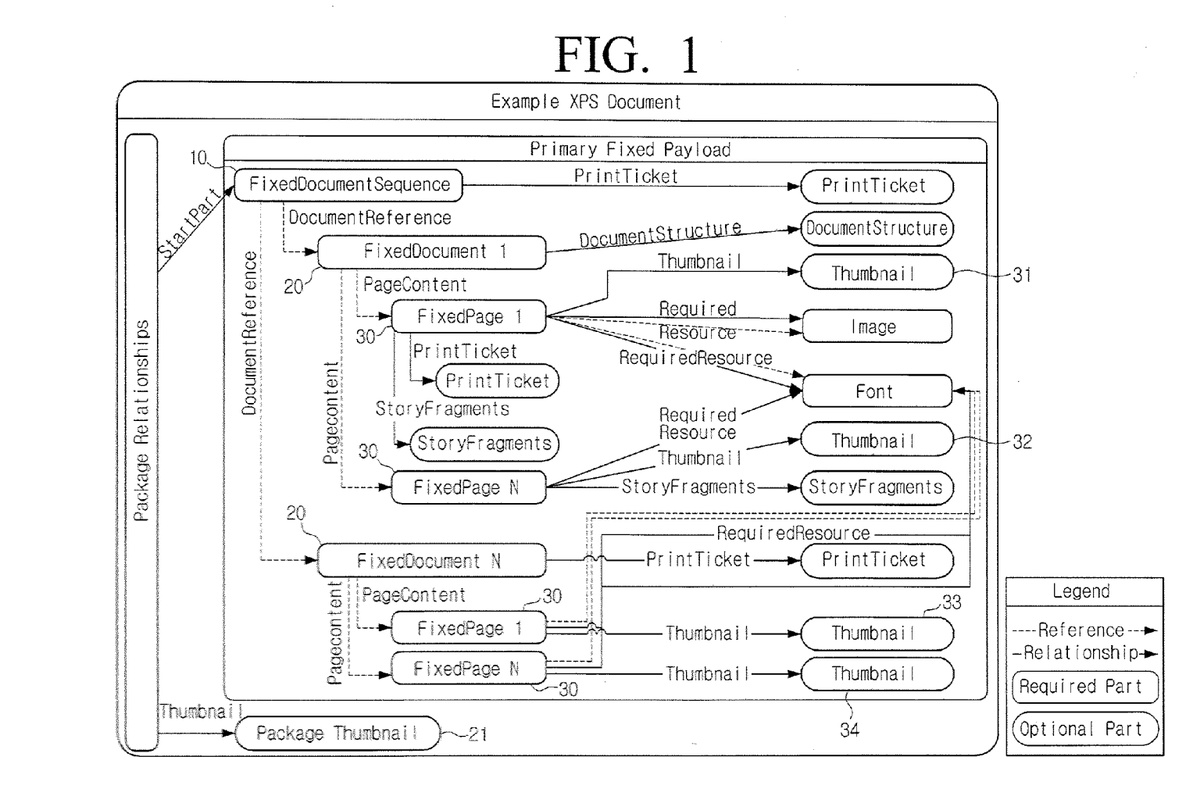
FIG. 1 exemplarily illustrates a logical structure of an XML paper specification (XPS) file.

Referring to FIG. 1, an XPS file is represented with a job level, a document level and a page level located in a hierarchical branching structure. The document level includes a plurality of documents, and the page level includes a plurality of pages. Different print options may be set for each of the plurality of documents and for each of plurality of pages. Additionally, the XPS file contains thumbnails representing each of the plurality of documents and each of the plurality of pages.

However, a conventional image forming apparatus does not support a function of previewing thumbnails contained in an XPS file. Additionally, users can only view a thumbnail set as a default view in the XPS file. Therefore, there is a need for methods for users to selectively preview thumbnails they desire to view.

SUMMARY

The present general inventive concept provides a thumbnail display method to analyze a structure of thumbnails contained in an XML paper specification (XPS) file and to provide a user with information regarding the thumbnails, and an image forming apparatus.

Additional features and utilities of the present general inventive concept will be set forth in part in the description which follows and, in part, will be obvious from the description, or may be learned by practice of the general inventive concept.

Exemplary embodiments of the present general inventive concept may be achieved by providing a method of displaying a thumbnail, the method including receiving a selection of an XML paper specification (XPS) file, receiving a preview command for the selected XPS file, analyzing a structure of the XPS file, and displaying thumbnail information regarding a plurality of thumbnails contained in the XPS file according to the analyzed structure.

The analyzing of the structure of the XPS file may include analyzing the structure of a document region and page region in the XPS file, and checking respectively the document region and the page region to determine whether the thumbnail information is contained in the document region and the page region.

The analyzing of the structure of the XPS file may include using a relationship information file contained in the XPS file to determine whether the thumbnail information is contained in the document region and the page region.

The relationship information file may be a REL file.

The thumbnail information may include at least one of a thumbnail image contained in the XPS file, information regarding a document region containing the thumbnail image, and information regarding a page region containing the thumbnail image.

The displaying of the thumbnail information may include displaying the thumbnail information in a list or tree form.

The displaying of the thumbnail information may include displaying the thumbnail information using a user interface window, which may include a first field to display the structure of the XPS file and a second field to display whether thumbnails exist for each document region and each page region in the XPS file.

The displaying of the thumbnail information may include displaying the thumbnail information using a user interface window, which may include a first field to display the structure of the XPS file and a second field to display a plurality of thumbnail images corresponding to each document region and each page region in the XPS file.

The method may further include receiving a selection of at least one of the plurality of displayed thumbnail images; and converting a display form of the selected thumbnail image and displaying the thumbnail image of which the display form is converted.

The method may further include receiving a selection of at least one of the plurality of displayed thumbnail images; and printing the at least one thumbnail image selected.

The printing of the at least one thumbnail image selected may include printing the at least one thumbnail image selected or a page image of the XPS file corresponding to the at least one thumbnail image selected.

The displaying of the thumbnail information may include, if there is no thumbnail in the XPS file, displaying a notification that there is no thumbnail.

Exemplary embodiments of the present general inventive concept may also be achieved by providing an image forming apparatus including a storage unit to store an XML paper specification (XPS) file, a user interface to receive a preview command for the selected XPS file, an analyzer to analyze a structure of the XPS file, and a controller to control the user interface to display thumbnail information regarding a plurality of thumbnails contained in the XPS file according to the analyzed structure.

The analyzer may analyze the structure of a document region and page region in the XPS file, and may check respectively the document region and the page region to determine whether the thumbnail information is contained in the document region and the page region, so as to analyze the structure of the XPS file.

The analyzer may determine whether the thumbnail information is contained in the document region and the page region, using a relationship information file contained in the XPS file.

The relationship information file may be a REL file.

The thumbnail information may include at least one of a thumbnail image contained in the XPS file, information regarding a document region containing the thumbnail image, and information regarding a page region containing the thumbnail image.

The user interface may display the thumbnail information in a list or tree form.

The user interface may display the thumbnail information using a user interface window, which includes a first field to display the structure of the XPS file and a second field to display whether thumbnails exist for each document region and each page region in the XPS file.

The user interface may display the thumbnail information using a user interface window, which includes a first field to display the structure of the XPS file and a second field to display a plurality of thumbnail images corresponding to each document region and each page region in the XPS file.

The user interface may receive a selection of at least one of the plurality of displayed thumbnail images, convert a display form of according to the analyzed structure and display the thumbnail image of which the display form is converted.

The user interface may receive a selection of at least one of the plurality of displayed thumbnail images, and the controller may print the at least one thumbnail image selected.

The controller may print the at least one thumbnail image selected or a page image of the XPS file corresponding to the at least one thumbnail image selected.

If there is no thumbnail in the XPS file, the user interface may display a notification that there is no thumbnail.

The storage unit may include at least one of a storage medium built in the image forming apparatus, a portable storage medium capable of being connected to the image forming apparatus, a storage medium in a terminal device, and a web server.

Exemplary embodiments of the present general inventive concept may also be achieved by providing a method of analyzing an XML paper specification (XPS) file, the method including analyzing data of a selected XPS file, and displaying thumbnail information of the analyzed data.

Analyzing data may include analyzing a structure of the selected XPS file.

Analyzing data may include analyzing a structure of the selected XPS file in response to a user command.

Analyzing data may include analyzing the structure using a thumbnail address in the XPS file.

Analyzing data may include analyzing the structure using a file name of a thumbnail image in the XPS file.

Analyzing data may include analyzing the structure using a folder name of a folder containing a thumbnail image in the XPS file.

Displaying thumbnail information may include displaying a thumbnail image of a selected thumbnail corresponding to the thumbnail information.

Displaying thumbnail information may include converting a display format of a selected thumbnail image and displaying the thumbnail image in the converted format.

The method may further include printing a thumbnail image corresponding to the thumbnail information.

Exemplary embodiments of the present general inventive concept may also be achieved by providing an image forming apparatus, including an analyzer to analyze data of a selected XML page specification (XPS) file, and a user interface to display thumbnail information of the analyzed data.

The data may include a structure of the selected XPS file.

The user interface may receive a command to display a preview of the selected XPS file and the analyzer may analyze the data in response to the received command.

The analyzer may analyze the structure using a file name of a thumbnail image in the XPS file.

The analyzer may analyze the structure using a folder name of a folder containing a thumbnail image in the XPS file.

The user interface may display a thumbnail image corresponding to the thumbnail information.

The user interface may convert a display format of a thumbnail image corresponding to the thumbnail information and displays the thumbnail image in the converted format.

The image forming apparatus may further include an image forming unit to print a thumbnail image corresponding to the thumbnail information.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EMBODIMENTS

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 2:
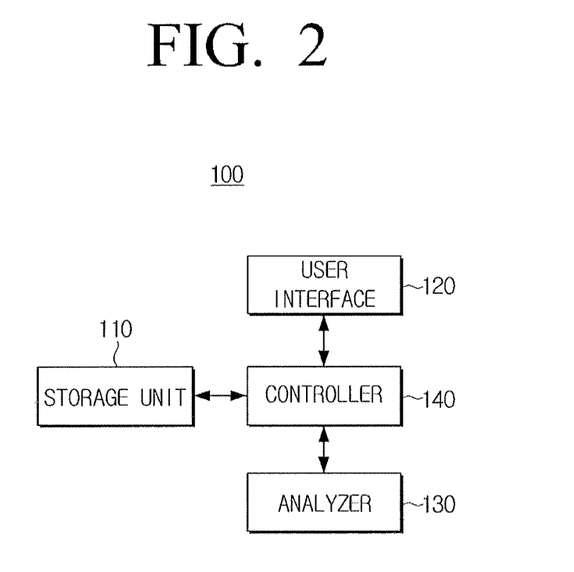
FIG. 2 is a block diagram illustrating an image forming apparatus according to an exemplary embodiment of the present general inventive concept.

FIG. 2 is a block diagram illustrating an image forming apparatus 100 according to an exemplary embodiment of the present general inventive concept. The image forming apparatus 100 illustrated in FIG. 2 includes a storage unit 110, a user interface 120, an analyzer 130 and a controller 140.

The storage unit 110 stores an XML paper specification (XPS) file. The storage unit 110 may be implemented as a storage medium built in the image forming apparatus 100, such as a hard disk or other internal memory, or as an external storage medium, for example a removable disk such as a universal serial bus (USB) memory, a storage medium connected to a host device, or a web server connected via a network.

Here, the XPS file, as described above, refers to print data to which print options are set, and which is represented in the form of a tree structure having a plurality of levels. Specifically, the XPS file has a plurality of levels, each of which has one or more nodes, and different print options may be set for each node of the plurality of levels. Additionally, the XPS file contains thumbnails representing each document and each page. For example, referring to FIG. 1, an XPS file is represented as having a job level 10, a document level 20 and a page level 30 located in a hierarchical branching structure. The document level 20 includes a plurality of documents (illustrated as FixedDocument 1-N), and the page level 30 includes a plurality of pages (illustrated as FixedPage 1-N under each FixedDocument 1-N). The XPS file of FIG. 1 contains a package thumbnail 21, and thumbnails 31, 32, 33, 34 corresponding to each of the plurality of pages at the page level 30.

The user interface 120 includes a plurality of function keys through which a user is able to set or select various functions supported by the image forming apparatus 100. The user interface 120 can receive a preview command input by a user, or can display a variety of information provided by the image forming apparatus 100. The user interface 120 may be implemented, for example, as an apparatus such as a touch pad, which is able to simultaneously implement input and output, or, for example, as an apparatus combining a mouse and a monitor. A user may select an XPS file he or she desires to view in advance, using a user interface window provided by the user interface 120. Additionally, the user may access thumbnail information on various thumbnails contained in the selected XPS file, and may decide whether to print a page corresponding to a predetermined thumbnail.

The analyzer 130 can analyze a structure of an XPS file. Specifically, the analyzer 130 can determine whether thumbnail information is contained in each document region and each page region in the XPS file.

An XPS file, as described above, refers to a zip-formatted file which includes all kinds of data and resources described by systematizing all resources required for documents or jobs in a directory structure. Accordingly, to decompress the XPS file, thumbnails corresponding to each document region and each page region need to be stored in corresponding resource folders in a Portable Network Graphics (PNG) or Joint Photographic Experts Group (JPG) file format. Additionally, a relationship information file in which thumbnail information regarding the thumbnails is written needs to be stored in a corresponding directory in a REL file format.

The relationship information file contains thumbnail information associated with each document region and each page region, and is classified and stored in directories for each document region and each page region. The structure of the relationship information file will now be described with reference to FIGS. 3A and 3B.

Figure 3A:
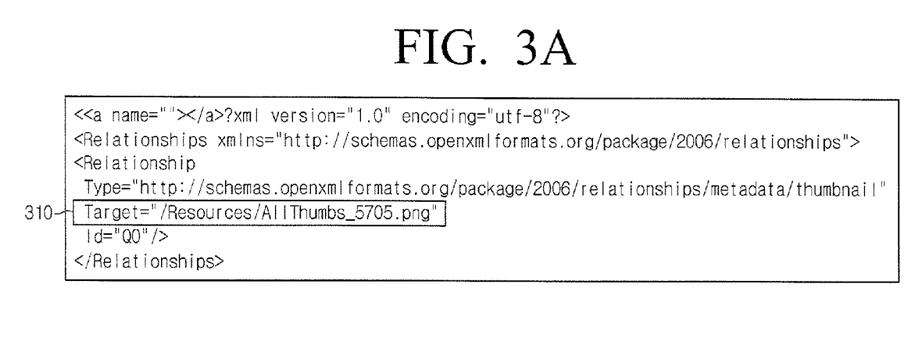
FIGS. 3A and 3B exemplarily illustrate relationship information files (.rel files).
Figure 3B:
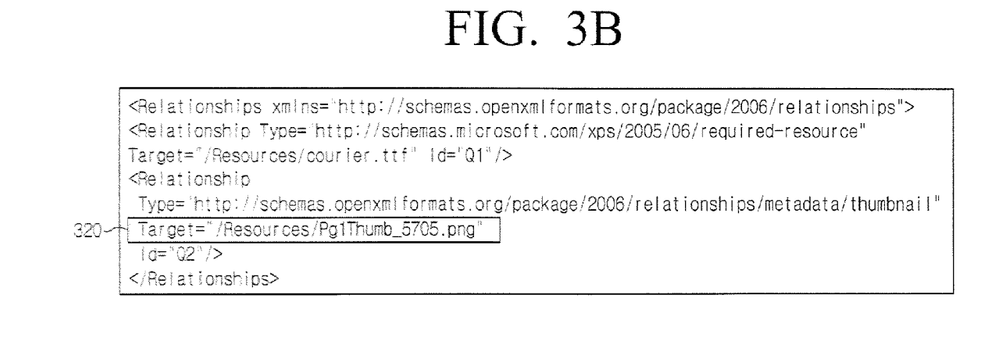

FIG. 3A exemplarily illustrates a relationship information file containing thumbnail information associated with a document region of an XPS file. As illustrated in FIG. 3A, a thumbnail address "Resource/AllThumbs_5705.png" 310 is illustrated in a box indicating a thumbnail representing the document region. FIG. 3B exemplarily illustrates a relationship information file containing thumbnail information associated with a page region of an XPS file. The thumbnail information associated with the page region includes a thumbnail address "Resource/Pg1Thumb_5705.png" 320 written therein as illustrated in a box in FIG. 3B, to indicate a thumbnail representing the page region.

Figure 4:
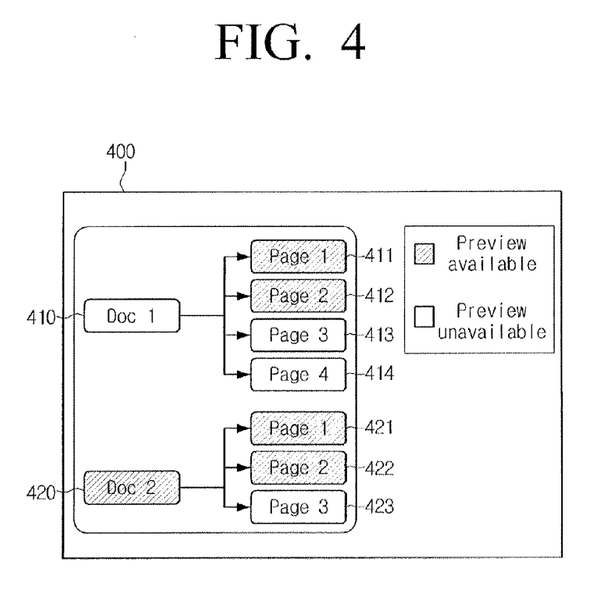
FIGS. 4 to 7 exemplarily illustrate user interface windows to be displayed on the image forming apparatus illustrated in FIG. 2.

The analyzer 130 can determine whether thumbnail addresses are written in relationship information files associated with each document region and each page region of the XPS file, to check whether thumbnails exist in the corresponding document region or page region and to acquire thumbnail information such as a thumbnail address for the corresponding document region or page region. Additionally, the analyzer 130 can analyze a hierarchical branching structure of thumbnails in the XPS file using the acquired thumbnail information. The analyzed thumbnail structure may correspond to the XPS file structure as illustrated in FIG. 4.

The controller 140 can control the user interface 120 to display thumbnail information based on the analyzed structure of the XPS file. In more detail, the controller 140 can control the user interface 120 to display a variety of thumbnail information, for example, a thumbnail image contained in an XPS file, information regarding a document region containing the thumbnail image, or information regarding a page region containing the thumbnail image, using the thumbnail structure analyzed by the analyzer 130, in various forms of user interface windows, so as to provide a user with the thumbnail information. The user interface windows will be described in detail below.

If a user selects one or more thumbnail images or thumbnail information regarding a document region and page region with thumbnail images from among the displayed thumbnail information, the controller 140 may also control the user interface 120 to display a thumbnail image corresponding to the selected thumbnail information, or to convert a display format of the selected one or more thumbnail images and display the one or more thumbnail images of which the display format is converted. In this situation, the converting of the display format refers to zooming in or out on the selected one or more thumbnail images, or rotating and displaying the selected one or more thumbnail images.

Additionally, if a user selects at least one thumbnail image or thumbnail information regarding a document region and page region with thumbnail images from among the displayed thumbnail information, the controller 140 may print the at least one thumbnail image selected or a page image of the XPS file corresponding to the at least one thumbnail image selected.

If there is no thumbnail in the XPS file, the controller 140 can control the user interface 120 to notify a user of the absence of a thumbnail.

Therefore, the image forming apparatus 100 may analyze the thumbnails contained in the XPS file, and can provide a user with the thumbnail information based on the analyzed thumbnails, so it is possible for the user to easily and conveniently check the thumbnails contained in the XPS file.

While the XPS file can be stored in the storage unit 110 in an exemplary embodiment as illustrated in FIG. 2, there is no limitation thereto. Accordingly, the present general inventive concept is also applicable in a situation in which an XPS file is received from an external apparatus without needing to be stored in the storage unit 110. In this situation, the structure of thumbnails contained in the received XPS file may be analyzed to provide thumbnail information. Additionally, the analyzer 130 can analyze the thumbnail structure using the thumbnail addresses written in the relationship information files in an exemplary embodiment, but the analyzer 130 may analyze the thumbnail structure using file names of thumbnail images contained in the XPS file or the name of folders containing the thumbnail images.

Furthermore, while the image forming apparatus 100 is used as a thumbnail display apparatus according to an exemplary embodiment, there is no limitation thereto. Accordingly, the present general inventive concept is also applicable to apparatuses capable of displaying thumbnails other than the image forming apparatus 100, for example, a terminal device such as a personal computer (PC), a personal digital assistant (PDA) or a digital camera, and an image forming apparatus such as a copier, an inkjet printer, a laser beam printer (LBP) or a multifunctional peripheral (MFP).

FIG. 4 exemplarily illustrates a user interface window 400 to be displayed on a thumbnail display apparatus according to an exemplary embodiment of the present general inventive concept.

In FIG. 4, the user interface window 400 includes a first field to display a structure of a currently open XPS file, and a second field to display whether thumbnails exist for each document region and each page region in the XPS file. More specifically, the XPS file may contain thumbnails representing each document region and representing each page region. The user interface window 400 can display the structure of the currently open XPS file in a tree form, and can display whether or not thumbnails exist in each document region and each page region, for example, using a hashed background and a white background, respectively. Referring to FIG. 4, thumbnails are illustrated representing a first page 411 and second page 412 of a first document 410, a first page 421 and second page 422 of a second document 420, and the second document 420, with hashed boxes indicating that the document regions and page regions of the XPS file contain thumbnails. Therefore, it is possible for the user to easily know which document region and/or page region contain thumbnails. In this situation, the presence of thumbnails may be confirmed by displaying thumbnail images themselves, rather than displaying boxes (such as 411, 412, 420, 421, and 422) with the hashed pattern as illustrated in FIG. 4.

Figure 5:
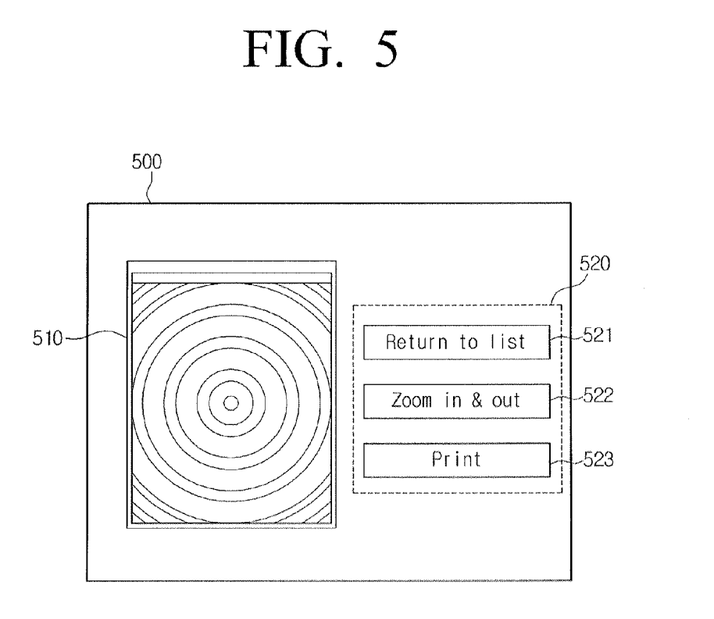

FIG. 5 exemplarily illustrates a user interface window 500 which can be displayed when a user selects one from among the document regions and page regions displayed on the user interface window 400 of FIG. 4.

In FIG. 5, the user interface window 500 can include a thumbnail display field 510 to display a thumbnail image corresponding to the document region and page region selected by the user, and a command input field 520 through which the user can input an additional user command. More specifically, if the user selects the document region and page region containing the thumbnail, a thumbnail image may be displayed on the thumbnail display field 510, as illustrated in FIG. 5. Subsequently, various control commands may be displayed on the command input field 520 to additionally control the thumbnail image displayed on the thumbnail display field 510.

The command input field 520 can include a 'Return to list' box 521, a 'Zoom in & out' box 522 and a 'Print' box 523. For example, if the user selects the 'Return to list' box 521, the user interface window 400 of FIG. 4 may be redisplayed instead of the currently displayed user interface window 500 of FIG. 5, and if the user selects the 'Zoom in & out' box 522, the thumbnail image displayed on the thumbnail display field 510 may be zoomed in or out. Additionally, if the user selects the 'Print' box 523, a page corresponding to the thumbnail image displayed on the thumbnail display field 510 may be printed. Therefore, it is possible for the user to selectively view a desired thumbnail, and to input a print command for a corresponding document and page using a displayed user interface window, thereby increasing user convenience.

Figure 6:
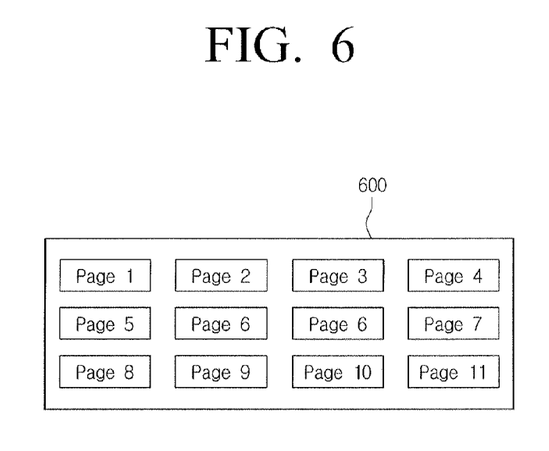
Figure 7:
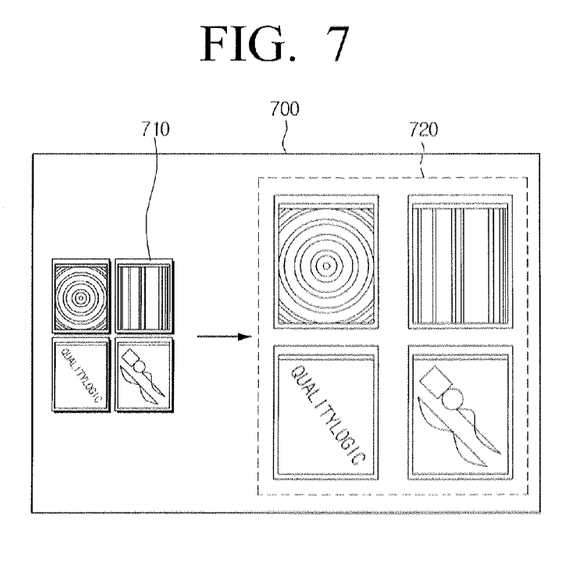

FIGS. 6 and 7 exemplarily illustrate user interface windows 600 and 700, respectively, to be displayed on a thumbnail display apparatus according to an exemplary embodiment of the present general inventive concept. The user interface window 600 has a shape different from the user interface window 700.

In more detail, the user interface window illustrated in FIG. 6 displays a list of information on pages containing thumbnails in a currently open XPS file. In this situation, if a user selects one thumbnail from the list, a user interface window as illustrated in FIG. 5 may be additionally displayed. Referring to FIG. 7, the user interface window 700 displays thumbnail images in the form of a tree corresponding to the structure of the XPS file. The displayed tree can include thumbnail information based on the analyzed structure of the XPS file. The user interface window 700 may include a first field 710 to display a structure of the XPS file and a second field 720 to display a plurality of thumbnail images corresponding to each document region and/or each page regions in the XPS file.

Figure 8:
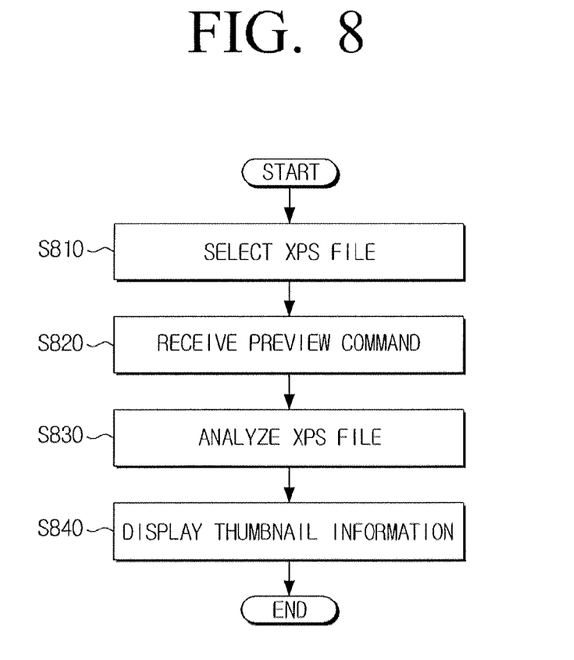
FIG. 8 is a flowchart illustrating a thumbnail display method according to an exemplary embodiment of the present general inventive concept.

FIG. 8 is a flowchart illustrating a thumbnail display method according to an exemplary embodiment of the present general inventive concept.

In FIG. 8, if a user selects an XPS file which he or she desires to preview in operation S810, and if a preview command for the selected XPS file is received in operation S820, the structure of the selected XPS file is analyzed in operation S830. In more detail, each document region and each page region in the XPS file are analyzed, so that a presence or absence of thumbnails in each document region and each page region may be determined according to whether a thumbnail address is written in a relationship information file associated with each document region and each page region and that thumbnail information such as a thumbnail address for a corresponding thumbnail may be acquired. Additionally, a thumbnail structure corresponding to the analyzed structure of the XPS file may also be analyzed using the acquired thumbnail information.

If the structure of the XPS file has been completely analyzed, thumbnail information may be displayed based on the analyzed structure of the XPS file in operation S840. More specifically, the thumbnail information, for example a thumbnail image contained in an XPS file, information regarding a document region containing the thumbnail image or information regarding a page region containing the thumbnail image, may be displayed using the analyzed thumbnail structure in various user interface forms, for example a list or tree. This displaying operation is performed in the same manner as described above with reference to FIGS. 4 to 7. Alternatively, if there is no thumbnail in the XPS file, a message providing notification of the absence of a thumbnail may be displayed.

Therefore, the thumbnail display method according to exemplary embodiments of the present general inventive concept may provide a user with thumbnail information by analyzing thumbnails contained in an XPS file, so it is possible for the user to easily and conveniently check thumbnails contained in the XPS file. The thumbnail display method of FIG. 8 may be performed by the image forming apparatus 100 configured as illustrated in FIG. 2, and may also be performed by image forming apparatuses other than the image forming apparatus 100 or by a terminal device.

Although several embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A method of displaying a thumbnail at an image forming apparatus, the method comprising:
   receiving a selection of an XML paper specification (XPS) file;
   receiving a preview command for the selected XPS file;
   analyzing a structure of the XPS file including at least one document region and at least one page region; and
   displaying thumbnail information regarding whether a plurality of thumbnails representing at least one document and at least one page of the at least one document are contained in the XPS file corresponding to the at least one document region and the at least one page region according to the analyzed structure prior to displaying the plurality of thumbnails.

2. The method of claim 1, wherein the analyzing of the structure of the XPS file further comprises checking respectively the document region and the page region to determine whether the thumbnail information is contained in the document region and the page region.

3. The method of claim 2, wherein the analyzing of the structure of the XPS file comprises using a relationship information file contained in the XPS file to determine whether the thumbnail information is contained in the document region and the page region.

4. The method of claim 3, wherein the displaying of the thumbnail information comprises displaying the thumbnail information using a user interface window, which comprises a first field to display the structure of the XPS file and a second field to display a plurality of thumbnail images corresponding to each document region and each page region in the XPS file.

5. The method of claim 4, further comprising:
   receiving a selection of at least one of the plurality of displayed thumbnail images; and
   converting a display form of the selected thumbnail image and displaying the thumbnail image of which the display form is converted.

6. The method of claim 1, wherein the thumbnail information comprises at least one of a thumbnail image contained in the XPS file, information regarding a document region containing the thumbnail image, and information regarding a page region containing the thumbnail image.

7. The method of claim 6, wherein the displaying of the thumbnail information comprises displaying the thumbnail information in a list or tree form.

8. The method of claim 1, wherein the displaying of the thumbnail information comprises displaying the thumbnail information using a user interface window, which comprises a first field to display the structure of the XPS file and a second field to display whether thumbnails exist for each document region and each page region in the XPS file.

9. An image forming apparatus, comprising:
   a storage unit comprising a hardware memory to receive and store a selected XML paper specification (XPS) file;
   a user interface unit to receive a preview command for the stored XPS file;
   an analyzer to analyze a structure of the XPS file including at least one document region and at least one page region; and
   a controller to control the user interface unit to display thumbnail information regarding whether a plurality of thumbnails representing at least one document and at least one page of the at least one document are contained in the XPS file corresponding to the at least one document region and the at least one page region according to the analyzed structure prior to displaying the plurality of thumbnails.

10. The image forming apparatus of claim 9, wherein the analyzer checks respectively the document region and the page region to determine whether the thumbnail information is contained in the document region and the page region, so as to analyze the structure of the XPS file.

11. The image forming apparatus of claim 10, wherein the analyzer determines whether the thumbnail information is contained in the document region and the page region, using a relationship information file contained in the XPS file.

12. The image forming apparatus of claim 9, wherein the thumbnail information comprises at least one of a thumbnail image contained in the XPS file, information regarding a document region containing the thumbnail image, and information regarding a page region containing the thumbnail image.

13. The image forming apparatus of claim 12, wherein the user interface unit displays the thumbnail information in a list or tree form.

14. The image forming apparatus of claim 12, wherein the user interface unit displays the thumbnail information using a user interface window, which comprises a first field to display the structure of the XPS file and a second field to display whether thumbnails exist for each document region and each page region in the XPS file.

15. The image forming apparatus of claim 12, wherein the user interface unit displays the thumbnail information using a user interface window, which comprises a first field to display the structure of the XPS file and a second field to display a plurality of thumbnail images corresponding to each document region and each page region in the XPS file.

16. The image forming apparatus of claim 15, wherein the user interface unit receives a selection of at least one of the plurality of displayed thumbnail images, converts a display form of according to the analyzed structure and displays the thumbnail image of which the display form is converted.

17. The image forming apparatus of claim 9, wherein the storage unit comprises at least one of a storage medium built in the image forming apparatus, a portable storage medium capable of being connected to the image forming apparatus, a storage medium in a terminal device, and a web server.

18. An image forming apparatus including a hardware memory, comprising:
   a document analyzer to receive an XML paper specification file (XPS) from the hardware memory and to analyze a hierarchical branching structure of the XPS file including at least one document region and at least one page region; and
   a user interface unit to display whether thumbnails representing at least one document and at least one page of the at least one document and corresponding to the at least one document region and the at least one page region of the hierarchical branching structure exist therein prior to displaying the plurality of thumbnails, thereby allowing a user to select at least one page from the XPS file to be individually viewed or printed.

* * * * *